(12) United States Patent
Nagata

(10) Patent No.: US 9,996,186 B2
(45) Date of Patent: Jun. 12, 2018

(54) PORTABLE DEVICE AND METHOD FOR DEFINING RESTRICTED AREA WITHIN TOUCH PANEL

(71) Applicant: KYOCERA Corporation, Kyoto-shi, Kyoto (JP)

(72) Inventor: Keisuke Nagata, Kobe (JP)

(73) Assignee: KYOCERA Corporation, Kyoto (JP)

( * ) Notice: Subject to any disclaimer, the term of this patent is extended or adjusted under 35 U.S.C. 154(b) by 53 days.

(21) Appl. No.: 14/868,169

(22) Filed: Sep. 28, 2015

(65) Prior Publication Data

US 2016/0092024 A1 Mar. 31, 2016

Related U.S. Application Data

(63) Continuation of application No. PCT/JP2014/058881, filed on Mar. 27, 2014.

(30) Foreign Application Priority Data

Mar. 27, 2013 (JP) ................................ 2013-065595

(51) Int. Cl.
  *G06F 3/041* (2006.01)
  *G06F 3/0488* (2013.01)
  (Continued)

(52) U.S. Cl.
  CPC .......... *G06F 3/0416* (2013.01); *G06F 3/0418* (2013.01); *G06F 3/0487* (2013.01);
  (Continued)

(58) Field of Classification Search
  CPC .... G06F 3/0487; G06F 3/0416; G06F 3/0488; G06F 3/0418; H04M 1/72577; H04M 2250/22; H04N 7/185
  See application file for complete search history.

(56) References Cited

U.S. PATENT DOCUMENTS

2009/0174679 A1* 7/2009 Westerman ......... G06F 3/03547
 345/173
2011/0216028 A1* 9/2011 Zotov .................. G06F 3/0416
 345/173
(Continued)

FOREIGN PATENT DOCUMENTS

JP 2000-039964 A 2/2000
JP 2010-279070 A 12/2010
(Continued)

OTHER PUBLICATIONS

International Search Report dated Jun. 10, 2014, issued for International Application No. PCT/JP2014/058881.
(Continued)

*Primary Examiner* — Abhishek Sarma
(74) *Attorney, Agent, or Firm* — Procopio Cory Hargreaves and Savitch LLP

(57) ABSTRACT

A portable phone device includes a display, a touch panel superimposed on the display and configured to detect a touch operation, an area defining module configured to define within the touch panel a restricted area in which acceptance of the touch operation is restricted, and a determination module configured to determine whether or not a screen being displayed on the display is a target screen for defining the restricted area. The area defining module defines the restricted area based on that the screen being displayed on the display is determined to be a target screen by the determination module.

4 Claims, 12 Drawing Sheets

(51) Int. Cl.
H04M 1/725 (2006.01)
H04N 7/18 (2006.01)
G06F 3/0487 (2013.01)

(52) U.S. Cl.
CPC ...... G06F 3/0488 (2013.01); H04M 1/72577 (2013.01); H04N 7/185 (2013.01); H04M 2250/22 (2013.01)

(56) References Cited

U.S. PATENT DOCUMENTS

| | | | |
|---|---|---|---|
| 2011/0285645 A1* | 11/2011 | Cho | G06F 3/0416 345/173 |
| 2012/0026200 A1* | 2/2012 | Okada | G06F 3/04886 345/660 |
| 2012/0075212 A1* | 3/2012 | Park | G06F 3/04886 345/173 |
| 2013/0285956 A1* | 10/2013 | Kamii | G06F 3/0416 345/173 |

FOREIGN PATENT DOCUMENTS

| | | |
|---|---|---|
| JP | 2011-034196 A | 2/2011 |
| JP | 2012-208795 A | 10/2012 |

OTHER PUBLICATIONS

Written Opinion of the International Searching Authority issued by Japan Patent Office for International Application No. PCT/JP2014/058881.

* cited by examiner

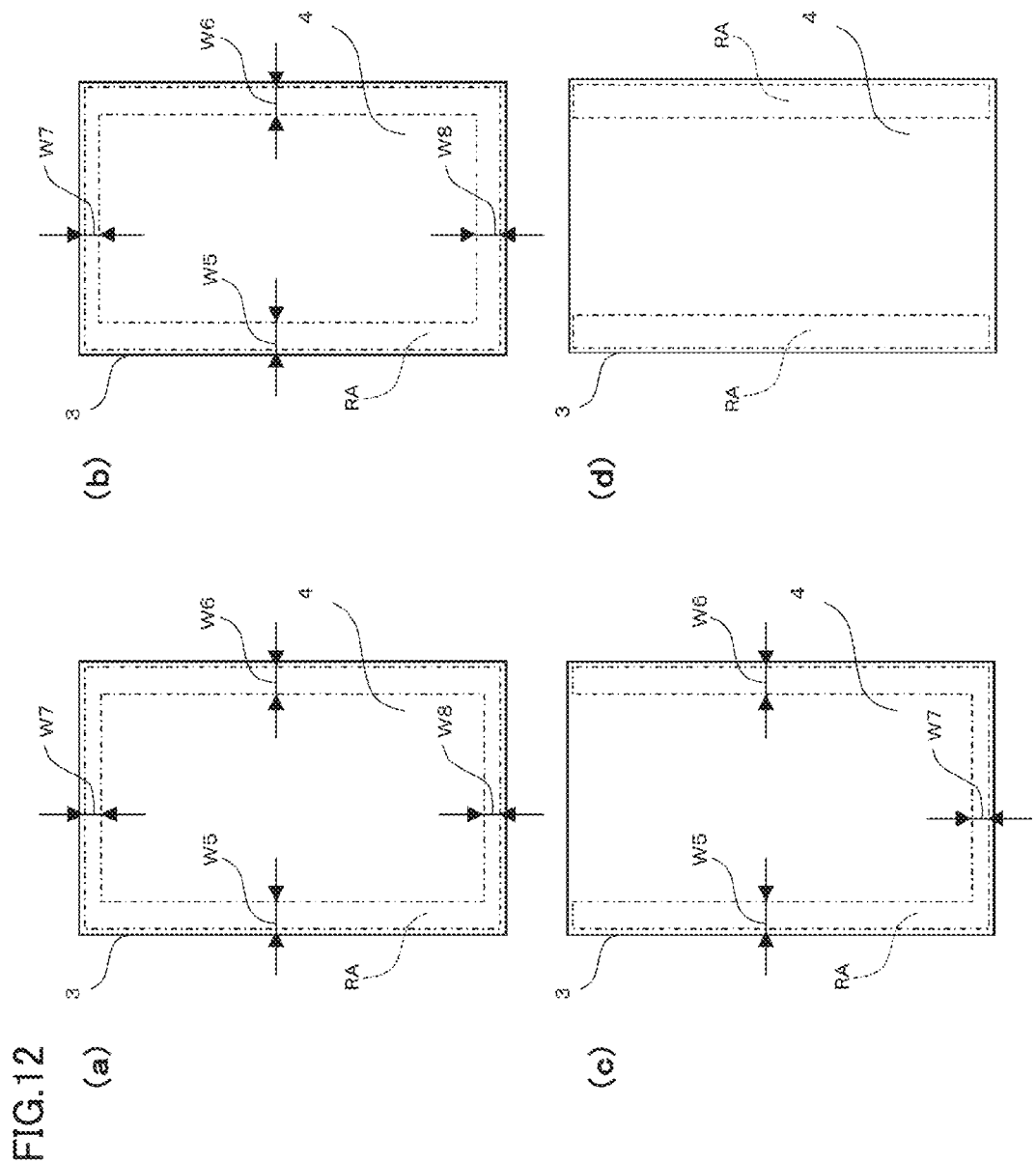

PORTABLE DEVICE AND METHOD FOR DEFINING RESTRICTED AREA WITHIN TOUCH PANEL

The present application is a continuation based on PCT Application No. PCT/JP2014/058881 filed on Mar. 27, 2014, entitled "Portable Device And Method For Setting Restricted Region On Touch Panel", which claims the benefit of Japanese Application No. 2013-065595, filed on Mar. 27, 2013, entitled "Portable Device and Method for Defining Restricted Area within Touch Panel". The disclosures of the above applications are each incorporated by reference herein.

FIELD

The present disclosure relates to a portable device such as a portable phone, a PDA (Personal Digital Assistant), a tablet PC, an e-book terminal, a portable music player, a portable television or a portable navigation system, and in particular relates to a portable device provided with a touch panel. Furthermore, the present disclosure relates to a method for defining a restricted area within a suitable touch panel used in such portable device.

BACKGROUND

Heretofore, such a portable phone that has a touch panel arranged on a display is known. The portable phone may adopt such a configuration that an invalid area for a touch operation is defined at an inner peripheral edge of the touch panel to invalidate the touch operation performed within the inner peripheral edge.

SUMMARY

A portable device according to a first aspect of the present disclosure may be configured to include a display, a touch panel superimposed on the display and configured to detect a touch operation, an area defining module configured to define within the touch panel a restricted area in which acceptance of the touch operation is restricted, and a determination module configured to determine whether or not a screen being displayed on the display is a target screen for defining the restricted area. The area defining module defines the restricted area based on that the screen being displayed on the display is determined to be a target screen by the determination module.

In a portable device according to the present disclosure, the restricted area may be defined within at least a part of an inner peripheral edge of the touch panel.

The portable device according to the present disclosure may further include an acceleration detection module configured to detect a dynamic acceleration generated in the portable device. In this case, the area defining module defines the restricted area based on that the screen being displayed on the display is determined to be a target screen by the determination module and that the dynamic acceleration is greater than a predetermined value.

The portable device with the abovementioned configuration may further include an imaging module configured to image the face of a user facing the display. In this case, the area defining module defines the restricted area based on that the screen being displayed on the display is determined to be a target screen by the determination module, and that the dynamic acceleration is greater than the predetermined value, and that the face of a user is not being imaged by the imaging module.

Alternatively or additionally, the portable device with the abovementioned configuration may further include an illuminance detection module configured to detect an environmental brightness of the portable device. In this case, the area defining module defines the restricted area based on that the screen being displayed on the display is determined to be a target screen by the determination module, and that the dynamic acceleration is greater than the predetermined value, and that the environmental brightness of the portable device is significantly lower than a predetermined amount.

The portable device according to the present disclosure may include a remaining amount detection module configured to detect a remaining battery amount. In this case, the acceleration detection module is activated to detect the dynamic acceleration when the remaining battery amount detected by the remaining amount detection module is greater than a predetermined amount.

A second aspect of the present disclosure relates to a method for defining a restricted area, in which acceptance of a touch operation is restricted, within a touch panel which is superimposed on a display and configured to detect the touch operation. The method for defining a restricted area according to the present aspect includes a step of determining whether or not a screen being displayed on the display is a target screen for defining the restricted area and a step of defining the restricted area based on the determination that the screen being displayed on the display is a target screen.

Effects and significance of the present disclosure will become more apparent from the description of the embodiments given below. It should be noted that each of the following embodiments is given for the purpose of illustration and example only and is not to be taken by way of limiting the present disclosure.

BRIEF DESCRIPTION OF THE DRAWINGS

FIG. 12 is a diagram for explaining the restricted area with different widths.

DETAILED DESCRIPTION

On a display of a portable device such as a portable phone, various screens are displayed in accordance with application programs (hereinafter, simply referred to as "application") in operation. The screens to be displayed on the display may include screens on which frequent operations will be performed by a user such as a mail creation screen for creating an e-mail, and screens on which less operation will be performed by the user such as a TV viewing screen. Thus, in the case where an invalid area is defined regardless of the screen to be displayed on the display, the operability of the portable device may be deteriorated unnecessarily.

Therefore, a portable device and a method for defining a restricted area within a touch panel, which can provide a satisfactory prevention of any erroneous operation by a user, are desired.

Hereinafter, embodiments of the present disclosure will be described with reference to the drawings.

FIGS. 1(a), 1(b) and 1(c) illustrate a front view, a rear view and a right side view of a portable phone 1, respectively. Hereinafter, for the convenience of explanation, as illustrated in FIGS. 1(a) to 1(c), the longer direction of a cabinet 2 is defined as the vertical direction, and the shorter direction of cabinet 2 is defined as the lateral direction.

Figure 1:
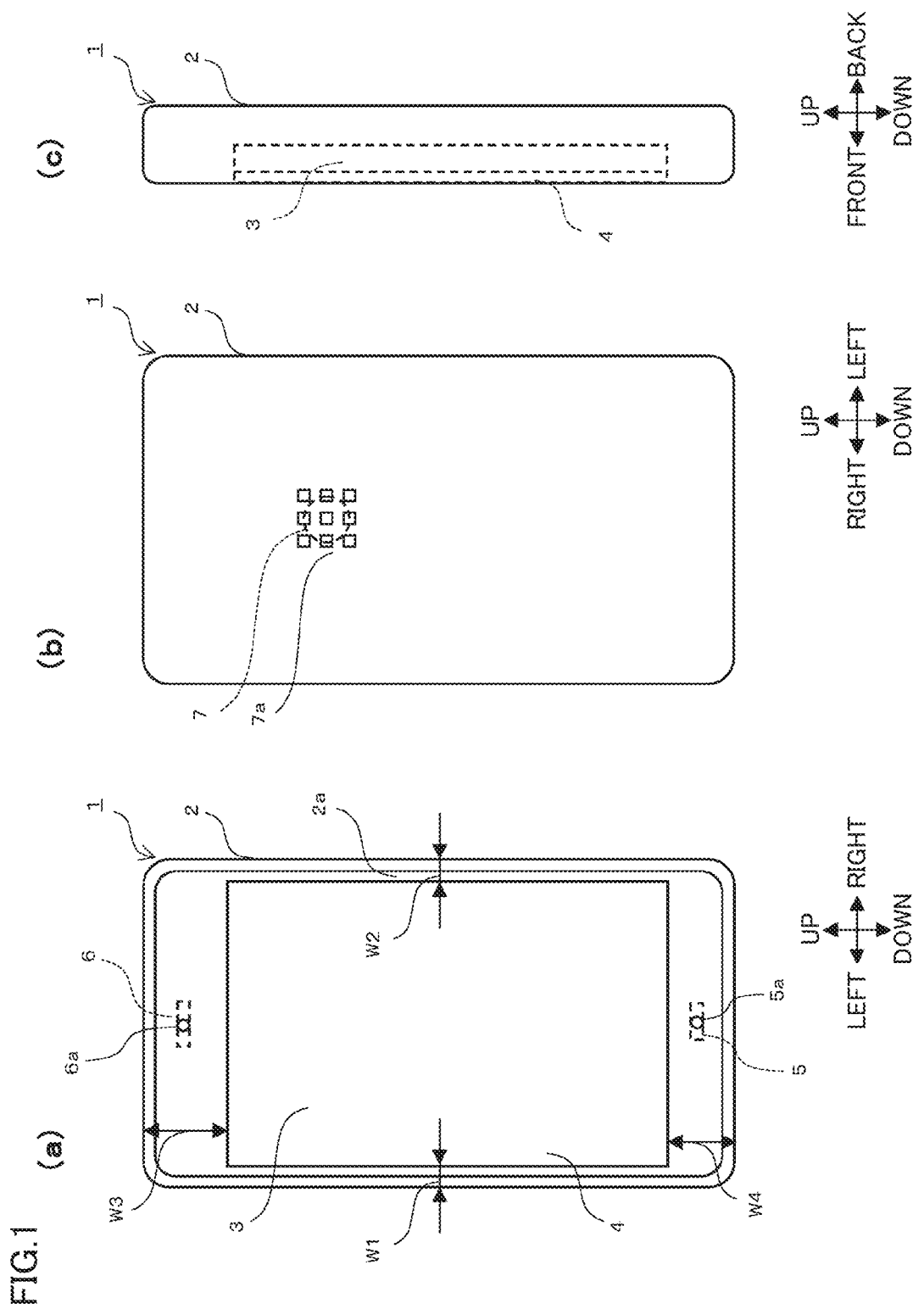
FIG. 1 is a diagram illustrating the configuration of a portable phone.

As illustrated in FIG. 1, portable phone 1 can include cabinet 2, a display 3, a touch panel 4, a microphone 5, and a conversation speaker 6, and an external speaker 7.

Cabinet 2 can have a profile of substantially rectangular shape when viewed from the front surface. Display 3 can be arranged on the front side of cabinet 2. Display 3 is configured to display a variety of images (screens). Display 3 can be a liquid crystal display, for example. Display 3 may be another type of display such as an organic EL display or the like.

Touch panel 4 can be arranged to cover display 3. Touch panel 4 can be formed into a transparent sheet. Touch panel 4 may be implemented by any of various types of touch panels such as an electrostatic capacitance type touch panel, an ultrasonic touch panel, a pressure sensitive touch panel, a resistive film type touch panel or an optical detection type touch panel.

Microphone 5 can be disposed inside cabinet 2 near a lower end thereof. Conversation speaker 6 can be disposed inside cabinet 2 near an upper end thereof. Microphone 5 is configured to receive sound passed through a microphone hole 5a formed on the front surface of cabinet 2. Microphone 5 is further configured to generate an electric signal in response to the received sound. Conversation speaker 6 is configured to output sound. The output sound is broadcasted to the outside of cabinet 2 through an output hole 6a formed on the front surface of cabinet 2. During a call, any phonetic sound received from a device (portable phone or the like) of a communication partner is output from conversation speaker 6, any phonetic sound issued by the user is input to microphone 5. The sound may include a variety of sounds such as voice, alarming sound and the like.

External speaker 7 can be disposed inside cabinet 2. An output hole 7a can be formed in an area on the back surface of cabinet 2 opposite to external speaker 7. The sound output from external speaker 7 can be broadcasted to the outside of cabinet 2 through output hole 7a.

A frame member 2a surrounding display 3 in cabinet 2 can be constituted by an upper frame, a lower frame, a left frame and a right frame. As described in the above, a space for disposing conversation speaker 6 can be provided in the upper part of cabinet 2, and a space for disposing microphone 5 can be provided in the lower part of cabinet 2. Thereby, the widths W1 and W2 of the respective left and right frames are configured narrower than the widths W3 and W4 of the upper and lower frames. The width W1 of the left frame is the same as the width W2 of the right frame, and the width W3 of the upper frame is wider than the width W4 of the lower frame.

Figure 2:
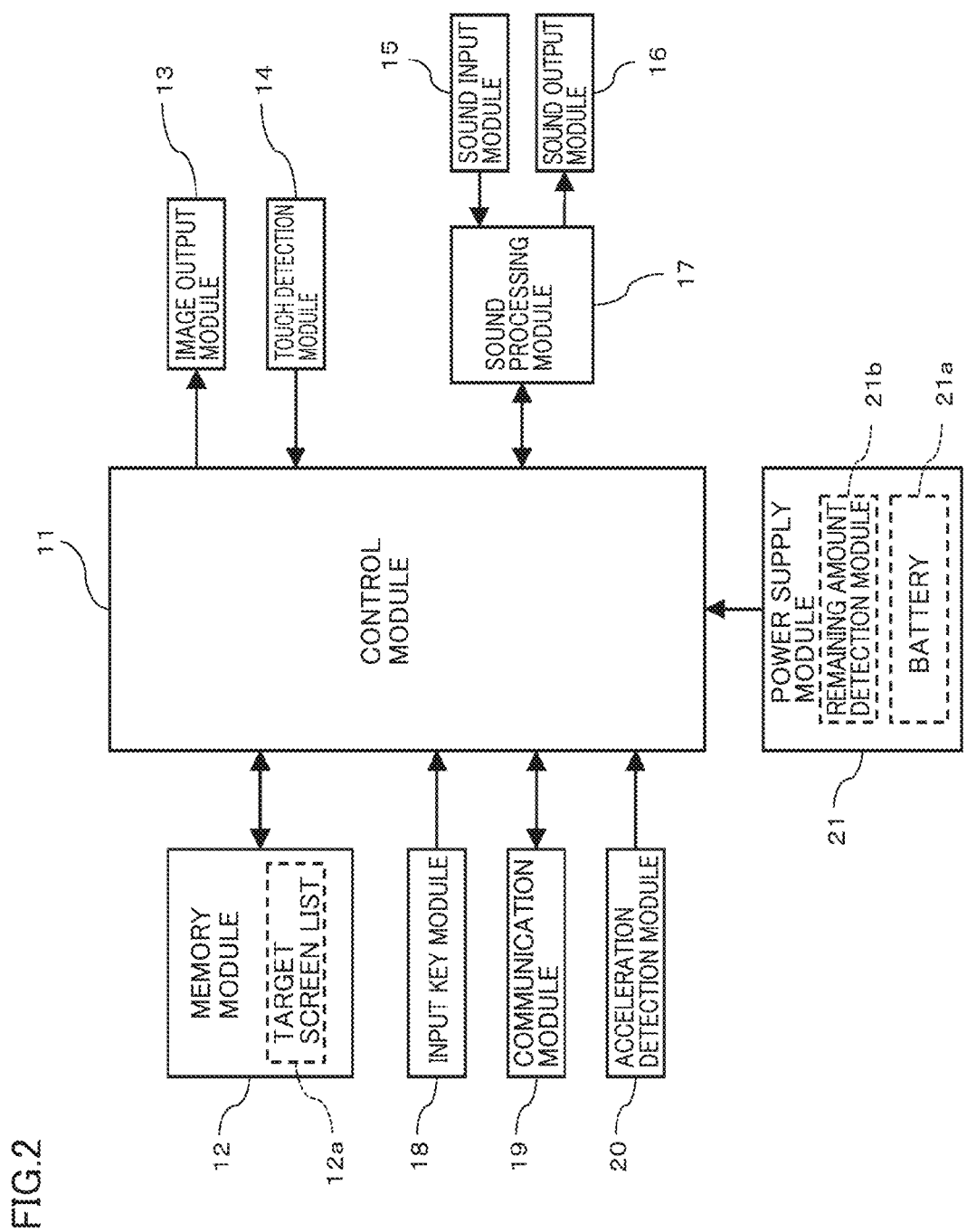
FIG. 2 is a block diagram illustrating the overall configuration of a portable phone.

FIG. 2 is a block diagram illustrating the overall configuration of portable phone 1.

As illustrated in FIG. 2, portable phone 1 can include a control module 11, a memory module 12, an image output module 13, a touch detection module 14, a sound input module 15, a sound output module 16, a sound processing module 17, an input key module 18, a communication module 19, an acceleration detection module 20, and a power supply module 21.

Memory module 12 can include a ROM, a RAM, and an external memory. Memory module 12 can store various programs. In addition to a control program for controlling each module in portable phone 1, the programs stored in memory module 12 can include various applications (for example, home, telephone, e-mail, web browser, maps, games, and schedule management). Such programs may be preliminarily stored by the manufacturer in memory module 12 at the time of manufacturing portable phone 1 or may be stored in memory module 12 thereafter via a communication network or a memory medium such as a memory card or a CD-ROM.

Moreover, memory module 12 can be provided with a working area for temporarily storing data to be used or to be generated during execution of a program.

Control module 11 can include a CPU. Control module 11 is configured to control each of the modules (such as memory module 12, image output module 13, touch detection module 14, sound input module 15, sound output module 16, sound processing module 17, input key module 18, communication module 19 and acceleration detection module 20) constituting portable phone 1 in accordance with the programs stored in memory module 12.

Image output module 13 can include display 3 as illustrated in FIG. 1. Image output module 13 is configured to display an image (screen) on display 3 based on a control signal and an image signal from control module 11.

Touch detection module 14 can include touch panel 4 as illustrated in FIG. 1. Touch detection module 14 is configured to detect a touch operation by a user on display 3 illustrated in FIG. 1 via touch panel 4. Specifically, when the user touches an area of display 3, touch detection module 14 can detect a position which the user has touched (hereinafter, referred to as a "touch position") by using touch panel 4. Touch detection module 14 can output a position signal which is generated based on the detected touch position to control module 11.

Owing to the provision of touch panel 4, a user can perform various touch operations by touching display 3, i.e., touch panel 4 with a finger. Examples of touch operations include a tap operation, a flick operation, a slide operation and the like. In a tap operation, a user touches touch panel 4 with a finger, and then releases the finger from touch panel 4 after a short time. In a flick operation, a user touches touch panel 4 with a finger, and then flips touch panel 4 with the finger toward an optional direction. In a slide operation, a user touches touch panel 4 with a finger, and moves the finger toward an optional direction with the finger touched on touch panel 4.

For example, if a touch position is detected by touch detection module 14, and the touch position is no longer detected within a predetermined first time period thereafter, control module 11 can determine that a tap operation has been performed. If a touch position is detected, and the touch position is moved by a predetermined first distance or more within a predetermined second time period, and thereafter the touch position is no longer detected, control module 11 can determine that a flick operation has been performed. If a touch position is detected and the touch position is moved by a predetermined second distance or more thereafter, control module 11 can determine that a slide operation has been performed.

Sound input module 15 can include microphone 5. Sound input module 15 is configured to output an electrical signal from microphone 5 to sound processing module 17.

Sound output module 16 can include conversation speaker 6 and external speaker 7. Sound output module 16 is configured to receive an electric signal from sound processing module 17 and output a sound through conversation speaker 6 or external speaker 7.

Sound processing module 17 is configured to perform an A/D conversion or the like on an electric signal from sound input module 15 so as to convert the electric signal into a digital sound signal, and output the digital audio signal to control module 11. Sound processing module 17 is also configured to perform a decoding process and a D/A conversion or the like on a digital sound signal from control module 11 so as to convert the digital sound signal to an electric signal, and output the electric signal to the sound output module 16.

Input key module 18 can include at least one or more hardware keys. For example, input key module 18 can include a power key or the like for turning on portable phone 1. Input key module 18 is configured to output a signal to control module 11 in response to a pressed hardware key.

Communication module 19 can include a circuit for converting signals, an antenna for interchanging electric waves, and the like so as to provide conversations or communications. Communication module 19 is configured to convert a conversation signal or a communication signal received from control module 11 into a radio signal, and transmit the converted radio signal to a communication partner such as a base station or another communication device through the antenna. Furthermore, communication module 19 is configured to convert the radio signal received through the antenna into a signal in a form that can be used by control module 11, and output the converted signal to control module 11.

Acceleration detection module 20 can include a triaxial acceleration sensor. Acceleration detection module 20 is configured to detect a static acceleration for portable phone 1 when portable phone 1 is in a static state, in other words, the acceleration of gravity through the triaxial acceleration sensor, and output a detection signal to control module 11 in response to the detected acceleration of gravity. Acceleration detection module 20 is also configured to detect a dynamic acceleration for portable phone 1 when portable phone 1 is in motion through the triaxial acceleration sensor, and output a detection signal to control module 11 in response to the detected dynamic acceleration.

Power supply module 21 can include a battery 21a and a remaining amount detection module 21b. Power supply module 21 is configured to supply power from battery 21a to control module 11 and the other modules. Power supply module 21 is also configured to supply power from an external power source to battery 21a so as to charge battery 21a. Furthermore, power supply module 21 is configured to output a detection signal to control module 11 in response to the remaining amount of battery 21a detected by remaining amount detection module 21b.

Figure 3:
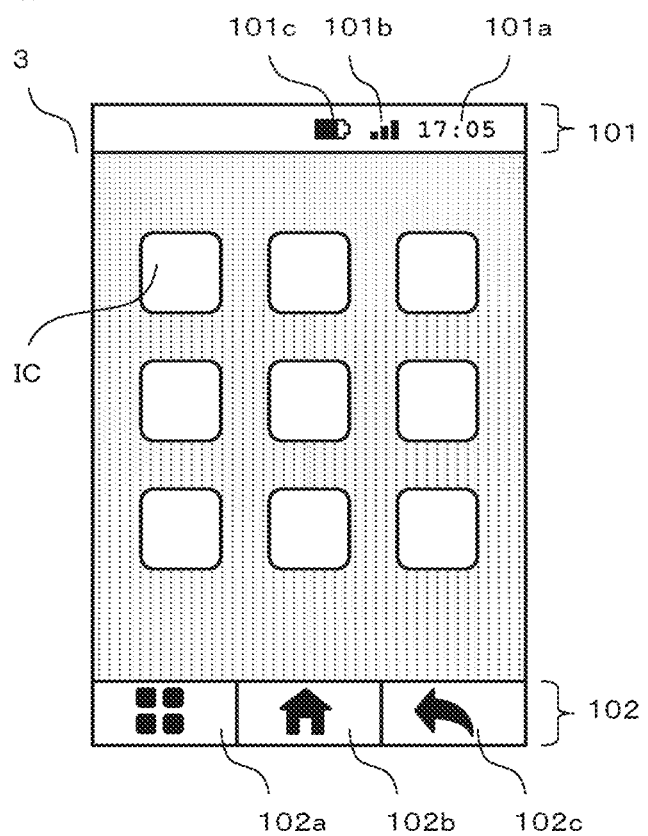
FIG. 3 is a diagram illustrating a home screen serving as an example of a screen being displayed on a display.

FIG. 3 is a diagram illustrating a home screen which is an example of a screen to be displayed on display 3.

The home screen can include activation icons IC for activating various applications. A tap operation on an activation icon IC lunches a corresponding application. A number of screens such as the home screen and the like to be displayed on display 3 in correspondence to an application include a notification bar 101 located at the top and an operation key group 102 located at the bottom.

Notification bar 101 can include current time 101a, a strength meter 101b indicating the strength of radio waves, a remaining amount meter 101c indicating the remaining battery amount, and the like. Operation key group 102 can include a setting key 102a, a home key 102b, a return key 102c and the like. Setting key 102a is mainly configured to invoke a setting screen to be displayed on display 3 so as to perform various settings. Home key 102b is mainly configured to bring display 3 from any other screen back to the home screen. Return key 102c is mainly configured to return a working process back to its prior step.

It should be noted that depending on the conditions of the screen, at least one of notification bar 101 and operation key group 102 may not be provided.

In portable phone 1 according to one embodiment, when a user is holding portable phone 1, the user may touch display 3, i.e., the inner peripheral edge of touch panel 4 with a finger without an intention of performing an operation, resulting in an erroneous operation. Thus, portable phone 1 is provided with a function to define within touch panel 4 a restricted area where acceptance of the touch operation is restricted by control module 11 (hereinafter, referred to as "restricted area defining function").

However, the definition of a restricted area will accordingly reduce the area where the touch operation is not restricted in touch panel 4, and thereby deteriorate the operability of the user to some extent. In addition, the screens to be displayed on display 3 may include screens on which frequent operations will be performed by a user such as a mail creation screen for creating an e-mail, and screens on which less operation will be performed by the user such as a TV viewing screen. Thus, in the case where a restricted area is defined regardless of the screen to be displayed on display 3, the operability of portable device 1 may be deteriorated unnecessarily.

Thus, the restricted area defining function provided in portable phone 1 according to one embodiment is configured to define a restricted area within touch panel 4 in accordance with a screen to be displayed on display 3. A restricted area defining process for implementing the restricted area defining function is performed by control module 11.

As illustrated in FIG. 2, memory module 12 is stored with a target screen list 12a. Target screen list 12a can be utilized by the restricted area defining process as information to determine whether or not a screen being displayed on display 3 is a target screen for defining a restricted area within touch panel 4.

Figure 4:
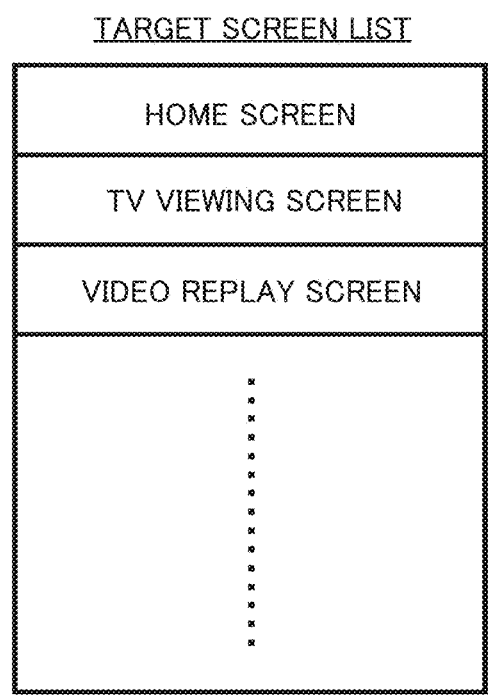
FIG. 4 is a diagram illustrating a list of target screens for defining a restricted area.

FIG. 4 is a diagram illustrating the configuration of target screen list 12a. Target screen list 12a is registered with a number of target screens for defining the restricted area. A target screen is such a screen that although it is displayed on display 3, there is a relatively low possibility that the touch operation will be performed thereon by the user. For example, the home screen, the television viewing screen, the video replay screen and the like may be given as examples of target screens. The home screen is an initial screen, and it is quite common that a user may return display 3 to the home screen after shutting down an application and thereafter quit the use of portable phone 1. In addition, when a user is watching a TV program on the television viewing screen or watching a video on the video replay screen, the user may seldom perform any operation. It should be noted that a mail creation screen or a web screen where touch operations are relatively frequently performed is not registered into target screen list 12*a*.

In addition, an application may be registered into target screen list 12*a*. The registration of an application means that all the screens of the application is registered, and thereby, all the screens of the registered application will be the target screen for defining the restricted area.

Memory module 12 is further stored with location information (coordinate information) serving as area information for defining a restricted area.

Control module 11 can function as an area defining module and a determination module, and is configured to define a restricted area based on the determination that a screen being displayed on display 3 is a target screen. More specifically, control module 11 can define the restricted area based on that the screen being displayed on display 3 is determined to be a target screen and that the dynamic acceleration detected by acceleration detection module 20 is greater than a predetermined value.

Figure 5B:
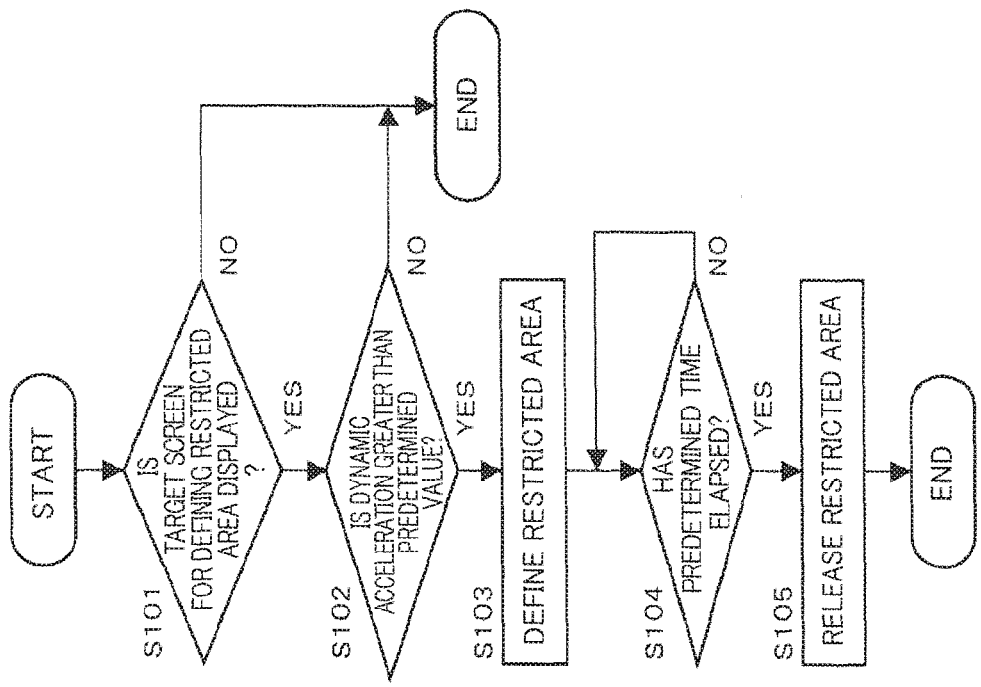
FIG. 5B is a diagram illustrating an example of a restricted area defined within a touch panel.
Figure 5A:
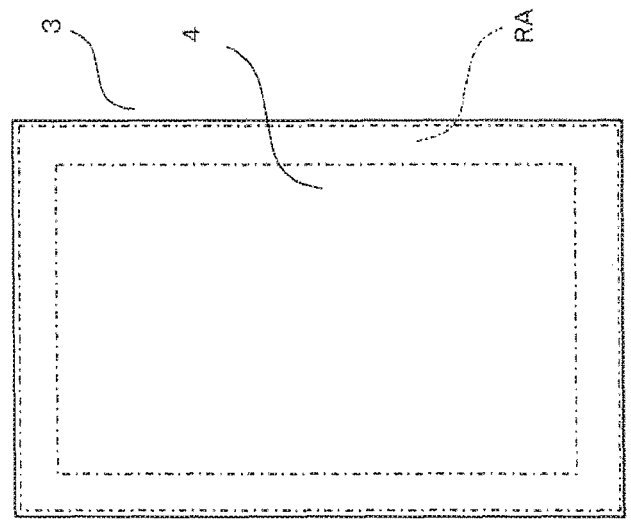
FIG. 5A is a flowchart illustrating a restricted area defining process.

FIGS. 5A and 5B are diagrams for explaining the restricted area defining function. FIG. 5A is a flowchart illustrating a restricted area defining process, and FIG. 5B is a diagram illustrating an example of a restricted area RA defined within touch panel 4.

While portable phone 1 is in operation, control module 11 can repeatedly execute the restricted area defining process. A screen is displayed on display 3 in correspondence to an application that is being executed in foreground. Control module 11, based on target screen list 12*a*, determines whether or not a screen that is being displayed on display 3 is a target screen for defining restricted area RA (S101). If the screen that is being displayed is registered in target screen list 12*a*, control module 11 determines that the screen that is being displayed is a target screen (S101: YES). In this case, control module 11 continues to determine whether or not the dynamic acceleration detected by acceleration detection module 20 is greater than a predetermined value (S102). The predetermined value may be obtained in such a manner that the dynamic acceleration generated when using portable phone 1 is measured in experiments, for example, and the predetermined value is derived from the measured values.

In the case where a user is holding and using portable telephone 1 in hand, portable phone 1 will not be remained stationary for all the time, and portable phone 1 may be moved to some extent. When such movement occurs in accordance with the use of portable phone 1, the dynamic acceleration that occurs in portable phone 1 may exceed the predetermined value. Thus, when a user is holding portable phone 1, the user may have a finger touched on touch panel 4 without an intention of performing an operation, resulting in an erroneous operation. At this time, if the screen that is being displayed on display 3 is a target screen, it is relatively unlikely to perform the touch operation on that screen by the user. Therefore, the definition of restricted area RA within touch panel 4 hardly deteriorate the operability of portable phone 1.

Thus, in the case where the dynamic acceleration is greater than the predetermined value (S102: YES), control module 11 can define restricted area RA within touch panel 4 (S103). According to one embodiment, as illustrated by the dot chain line in FIG. 5B, control module 11 can define restricted area RA along the entire inner peripheral edge of touch panel 4.

Control module 11 can perform a time counting through a timer built inside control module 11, and determine whether or not a predetermined time (for example, 30 seconds) has elapsed from the definition of restricted area RA (S104). If the predetermined time has elapsed (S104: YES), control module 11 releases restricted area RA (S105), and ends the restricted area defining process. Even in the case where portable phone 1 recovers immediately the stationary state after being moved, as mentioned in the above, restricted area RA will not be immediately released but continue to exist for the predetermined time.

In the case where portable phone 1 is not in use and is being placed on a desk or the like, since portable phone 1 is being kept stationary, the dynamic acceleration of portable phone 1 will not exceed the predetermined value. Since portable phone 1 is not being held by the user, erroneous operation will not be caused by the user through touching touch panel 4 with his/her fingers. Thus, there is no need to define restricted area RA within touch panel 4.

Thus, in the case where control module 11 determines that the dynamic acceleration is not greater than the predetermined value at step S102 (S102: NO), restricted area RA will not be defined within touch panel 4, and the restricted area defining process is ended.

On the other hand, in the case where the screen that is being displayed on display 3 is not a target screen, it is likely that the touch operations will be performed on the screen frequently by the user. Therefore, when a screen that is not a target screen is being displayed on display 3, if restricted area RA is defined within touch panel 4, the operability of portable phone 1 may be deteriorated significantly.

In the case where control module 11 determines that the screen that is being displayed is not a target screen at step S101 (S101: NO), restricted area RA will not be defined within touch panel 4, and the restricted area defining process is ended.

Immediately after a cycle of the restricted area defining process is ended, control module 11 restarts another cycle of the restricted area defining process. As long as the target screen is being displayed on display 3 and portable phone 1 is being held, immediately after the dynamic acceleration is detected greater than the predetermined value, restricted area RA is defined within touch panel 4 (S101: YES→S102: YES→S103).

As mentioned in the above, during the period when the target screen is being displayed on display 3 and portable phone 1 is being held, restricted area RA can be defined within touch panel 4 by repeating the restricted area defining process over substantially the whole period.

On the other hand, during the period when a screen that is not a target screen is being displayed on display 3 or during the period when a screen that is a target screen is being displayed on display 3 but portable phone 1 is not being held, restricted area RA will not be defined within touch panel 4.

Portable phone 1 according to one embodiment is provided with such a function that can determine whether portable phone 1 is being held along the lateral direction or the vertical direction based on the acceleration of gravity detected by acceleration detection module 20 and change the display direction of a screen being displayed on display 3 accordingly. Thus, while portable phone 1 is in operation, the acceleration sensor of acceleration detection module 20 is in constant working. In the case where it is not necessary to make the acceleration sensor work constantly, for example when portable phone 1 is not provided with the function of changing the display direction in response to its orientation, control module 11 may be configured to control acceleration detection module 20 in the restricted area defining process to activate the acceleration sensor in need of detecting an acceleration, and to stop the acceleration sensor after the acceleration detection is finished.

Figure 6:
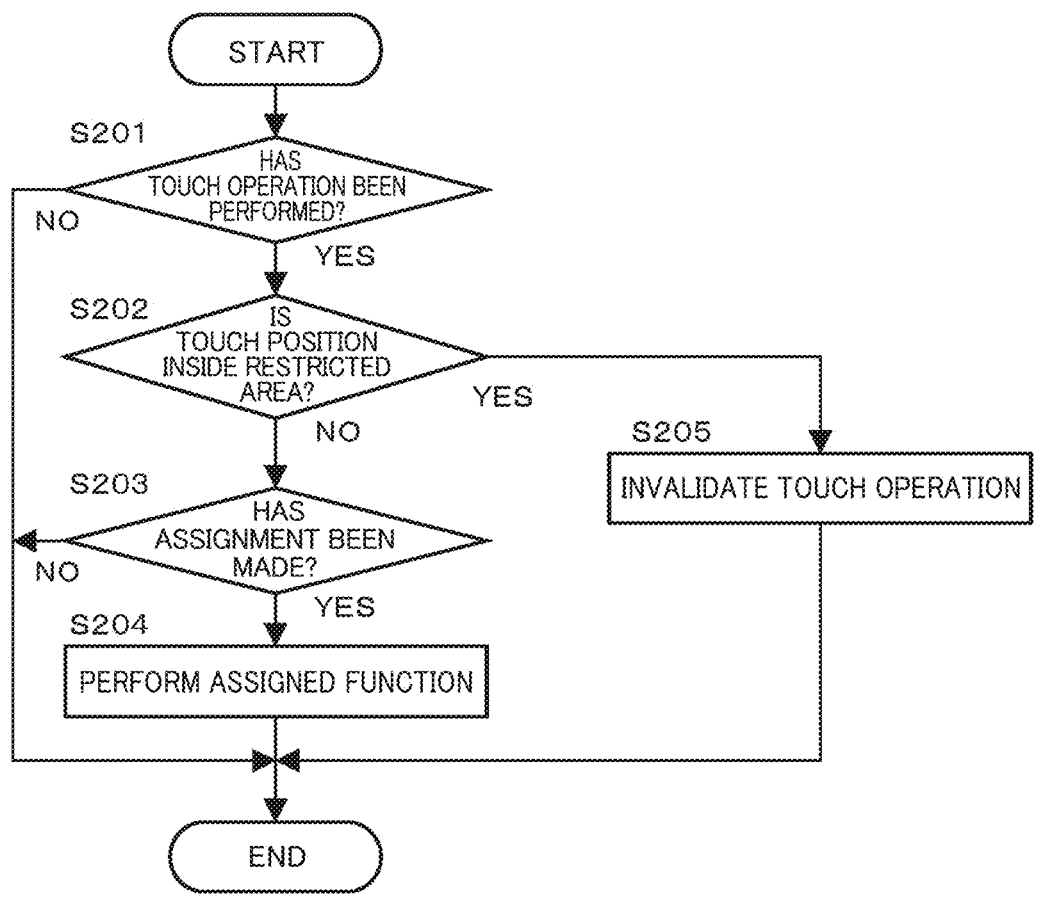
FIG. 6 is a flowchart illustrating a process of executing a function based on a touch operation performed after the restricted area is defined.

FIG. 6 is a flowchart illustrating a process of executing a function based on a touch operation performed after restricted area RA is defined. As long as portable phone 1 is in operation, the function execution process illustrated in FIG. 6 will be executed repeatedly.

Control module 11 can determine whether or not a touch operation has been performed on display 3 (S201). In the case where a touch operation has been performed on display 3 (S201: YES), control module 11 can refer to the area information stored in memory module 12 and determine whether the touch position detected from touch panel 4 is inside restricted area RA (S202).

In the case where the touch position is not inside restricted area RA (S202: NO), control module 11 can determine whether or not the touch operation performed at the touch position has been assigned with any function (S203). If a function is assigned (S203: YES), control module 11 can execute the assigned function (S204). For example, in the case where a tap operation has been performed at the position of one of activation icons IC in the home screen as illustrated in FIG. 3, control module 11 can activate an application related to the tapped activation icon IC.

On the other hand, in the case where the touch position is inside restricted area RA (S202: YES), control module 11 can invalidate the touch operation, and will not perform the assigned function (S205).

As mentioned in the above, according to one embodiment, restricted area RA can be defined within touch panel 4 based on that the screen being displayed on display 3 is such a screen that no frequent operation will be performed by a user thereon. Therefore, it is possible to prevent the erroneous operation from being performed on portable phone 1 while suppressing the deterioration in the operability of portable phone 1.

Furthermore, according to one embodiment, in the case where the screen being displayed on display 3 is such a screen that no frequent operation will be performed by a user thereon, and portable phone 1 is considered as being held by the user, restricted area RA can be defined within touch panel 4. Thereby, it is further possible to prevent the erroneous operation from being performed on portable phone 1 while suppressing the deterioration in the operability of portable phone 1.

An embodiment of the present disclosure has been described in the above, however, the present disclosure is not restricted in any means by the abovementioned embodiment, and may include various modifications other than the described embodiment.

<First Modification>

Figure 7:
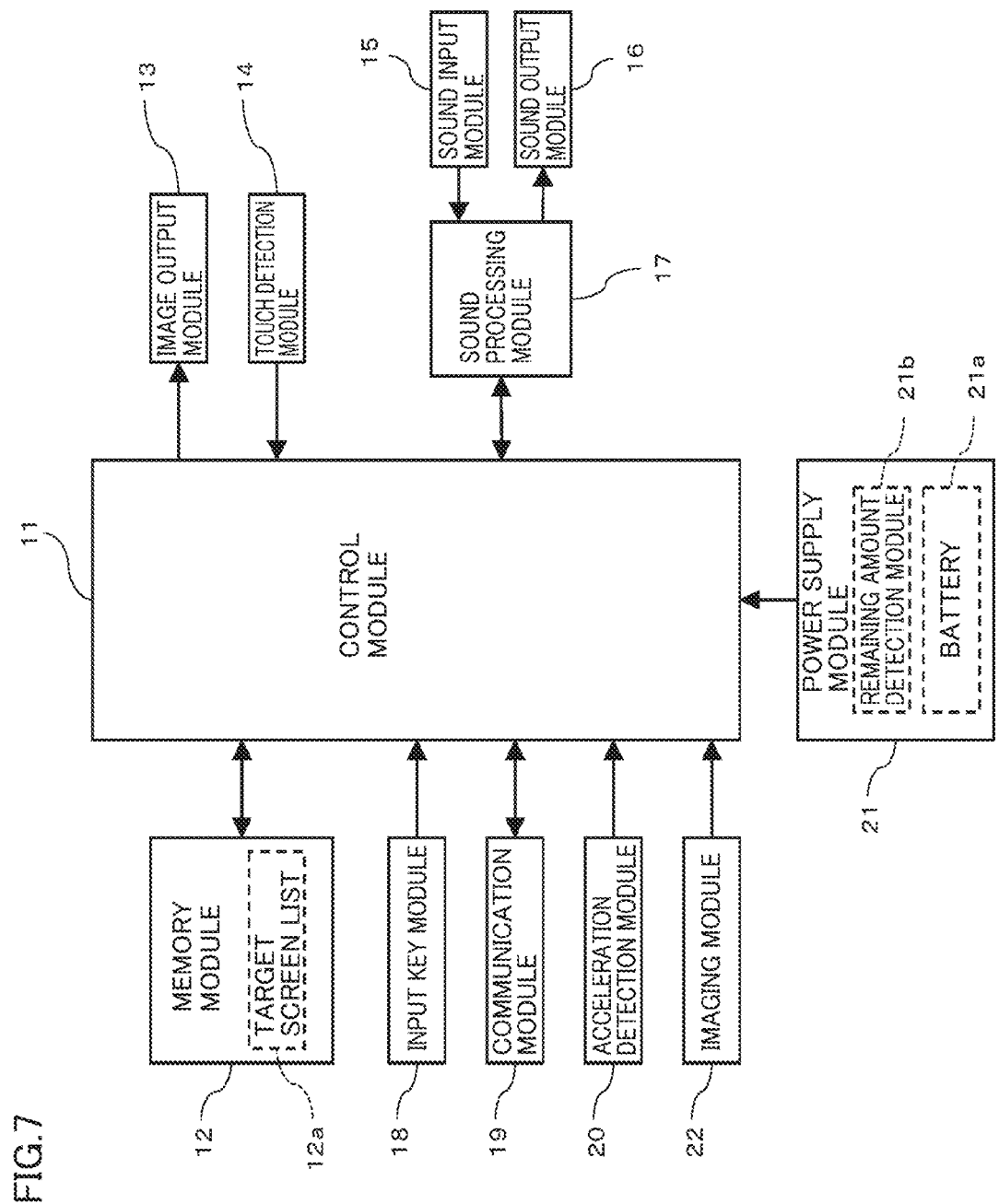
FIG. 7 is a block diagram illustrating the overall configuration of a portable phone.

FIG. 7 is a block diagram illustrating the overall configuration of portable phone 1 according to a first modification.

As illustrated in FIG. 7, portable phone 1 of the present modification can include an imaging module 22 in addition to the configurations of the abovementioned embodiment.

Imaging module 22 can include an in-camera arranged on the front side of cabinet 2. The in-camera is configured to photograph a subject present in the front direction of portable phone 1. Imaging module 22 can perform various image processing on image data of an image photographed by the in-camera, and output the processed image data to control module 11.

Figure 8:
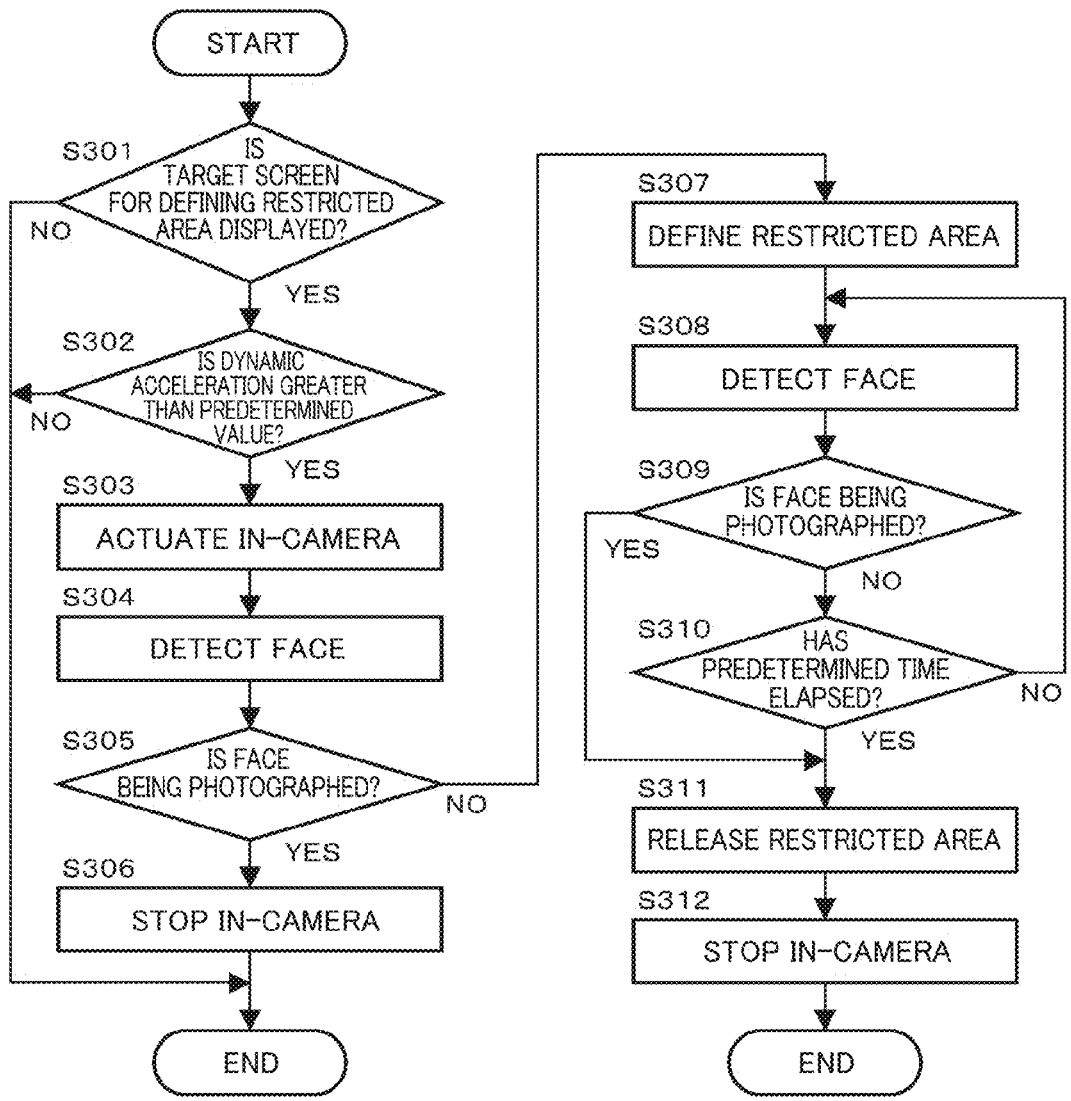
FIG. 8 is a flow chart illustrating a restricted area defining process.

FIG. 8 is a flow chart illustrating a restricted area defining process according to the first modification. Hereinafter, the description will be carried out on the restricted area defining process of the present modification with reference to FIG. 8.

In the case where a screen that is being displayed on display 3 is a target screen for defining restricted area RA (S301: YES) and the dynamic acceleration detected by acceleration detection module 20 is greater than the predetermined value (S302: YES), control module 11 can control imaging module 22 to activate the in-camera (S303). Control module 11 can perform a face detection process (S304), and determine whether or not a face has been photographed by the in-camera (S305).

As a user's face is directed to face portable phone 1, the face will be photographed by the in-camera. In this case, it is likely that the user is using portable phone 1, and in other words, portable phone 1 is being operated. Thus, in the case where control module 11 determines that the face is being photographed by the in-camera (S305: YES), control module 11 can stop the in-camera (S306), and end the restricted area defining process. Thereby, restricted area RA will not be defined within touch panel 4.

On the other hand, in the case where the face is not being photographed by the in-camera, it is likely that the user is not using portable phone 1. If the user is not using portable phone 1, there is no possibility that portable phone 1 is operated. Thus, in the case where control module 11 determines that the face is not being photographed by the in-camera (S305: NO), control module 11 can define restricted area RA within touch panel 4 (S307).

Control module 11 can perform the face detection process (S308), and determine whether or not a face has been photographed by the in-camera (S309). In the case where a face is not being photographed by the in-camera (S309: NO), control module 11 can determine whether or not a predetermined time has elapsed (S310). After the predetermined time has elapsed (S310: YES), control module 11 can release restricted area RA (S311).

Unless the predetermined time has elapsed (S310: NO), control module 11 can repeat the processing from step S308 and step S309.

In the case where a face is being photographed by the in-camera, it is likely that the user has started to use portable phone 1. In the case where control module 11 determines that a face is being photographed before the predetermined time has elapsed (S309: YES), control module 11 can unlock restricted area RA without waiting for the predetermined time to elapse (S311).

After releasing restricted area RA (S311), control module 11 can stop the in-camera (S312), and end the restricted area defining process.

As mentioned in the above, according to the present modification, restricted area RA is defined in the case where portable phone 1 is considered as not being used. Therefore, it is possible to further suppress the deterioration in the operability of portable phone 1.

Further, according to the present modification, after restricted area RA is defined, when it is considered that the use of portable phone 1 is started again, restricted area RA is released without waiting for the predetermined time to elapse. Therefore, it is possible to further suppress the deterioration in the operability of portable phone 1.

It is acceptable that the restricted area defining process of the present modification is further modified in such a manner that the processing from step S308 and step S309 is dispensed so that no face detection will be performed after restricted area RA is defined.

<Second Modification>

Figure 9:
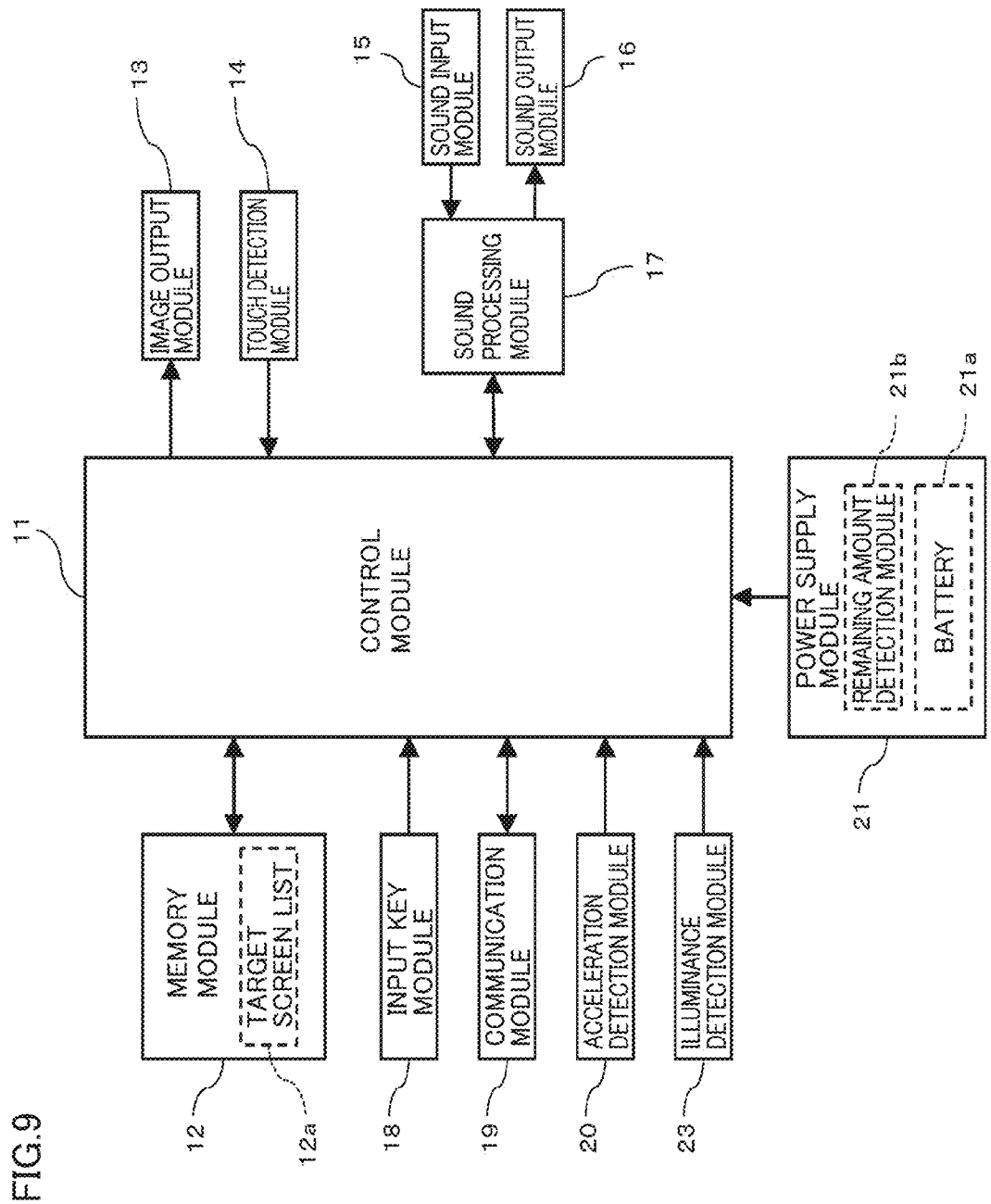
FIG. 9 is a block diagram illustrating the overall configuration of a portable phone.

FIG. 9 is a block diagram illustrating the overall configuration of portable phone 1 according to a second modification.

As illustrated in FIG. 9, portable phone 1 of the present modification can include an illuminance detection module 23 in addition to the configurations of the abovementioned embodiment.

Illuminance detection module 23 can include an illuminance sensor. Illuminance detection module 23 is configured to detect the environmental brightness of portable phone 1 by using the illuminance sensor, and output to control module 11 a detection signal in accordance with the detected illuminance. Although not shown in the drawings, the illuminance sensor may be arranged, for example, at the right side relative to conversation speaker 6 with a sensing component thereof exposed to the outside.

Figure 10:
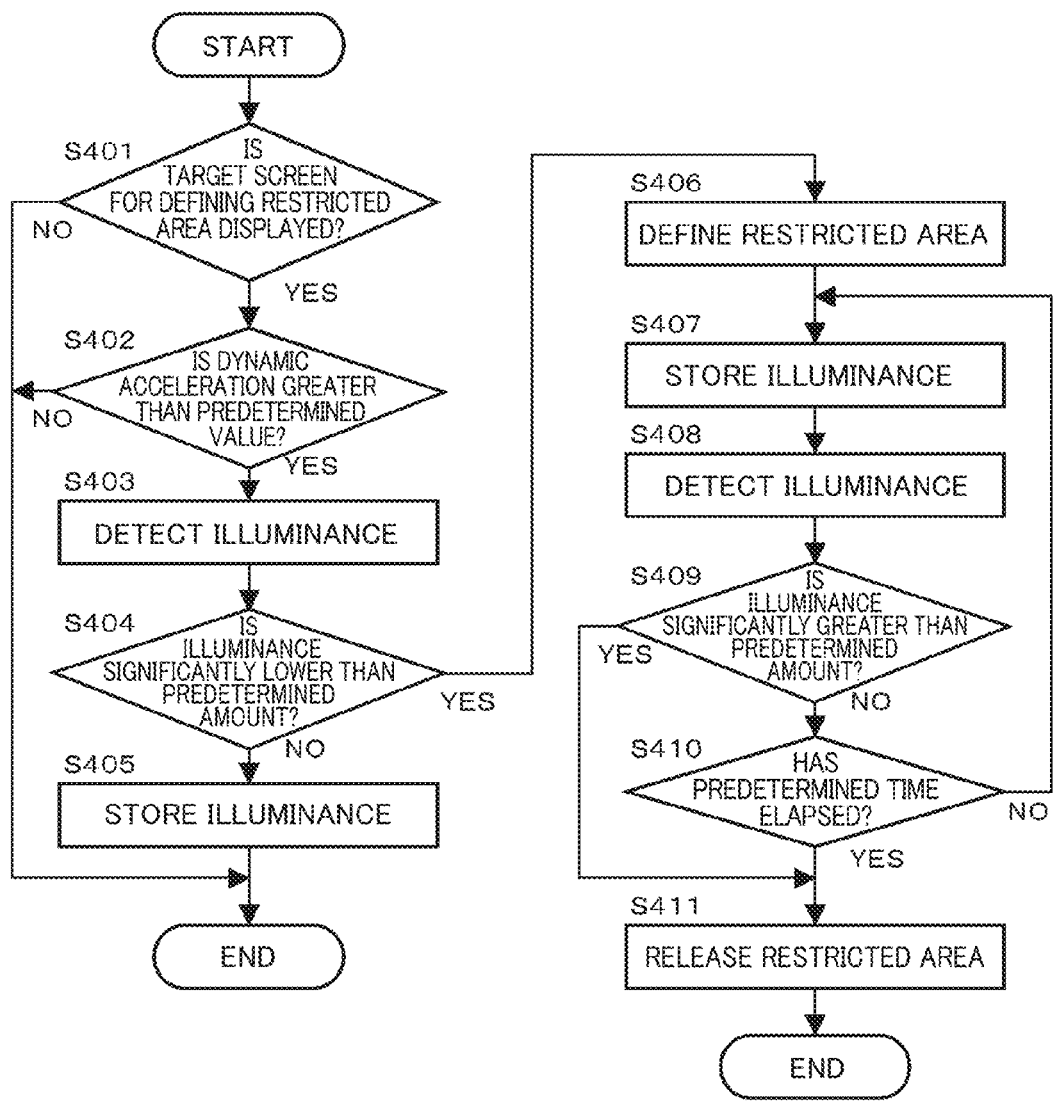
FIG. 10 is a flow chart illustrating a restricted area defining process.

FIG. 10 is a flow chart illustrating a restricted area defining process according to the second modification. Hereinafter, the description will be carried out on the restricted area defining process of the present modification with reference to FIG. 10.

In the case where a screen that is being displayed on display 3 is a target screen for defining restricted area RA (S401: YES) and the dynamic acceleration detected by acceleration detection module 20 is greater than the predetermined value (S402: YES), control module 11 can control illumination detection module 23 to detect the illuminance (S403). Control module 11 is configured to determine whether or not the detected illuminance is significantly lower than a predetermined amount based on a comparison between the currently detected illuminance and a previously detected illuminance stored in memory module 12 (S404). The predetermined amount may be obtained in such a manner that the changes in the illuminance occurred when putting portable phone 1 into a bag or the like are measured in experiments, for example, and the predetermined amount is derived from the measured values.

In the case where the user is using portable phone 1, normally it is unlikely that the outer environment of portable phone 1 suddenly becomes dark, causing the illuminance to decrease significantly. Thus, in the case where the illuminance is determined not to be significantly lower than the predetermined amount (S404: NO), control module 11 can store the currently detected illuminance in memory module 12 (S405) and end the restricted area defining process. Thereby, restricted area RA will not be defined within touch panel 4.

In the case where the illuminance detection is performed for the first time and thus there is no previously detected illuminance stored in memory module 12, control module 11 can determine that the illuminance is not significantly lower than the predetermined amount at step S404.

On the other hand, in the case where the user stops using portable phone 1 and puts it back into a pocket or a bag, the outer environment of portable phone 1 suddenly becomes dark, causing the illuminance to decrease significantly. Thus, in the case where the illuminance is determined to be significantly lower than the predetermined amount (S404: YES), control module 11 can define restricted area RA within touch panel 4 (S406).

After storing the detected illuminance in memory module 12 at step S403 (S407), control module 11 can detect the illuminance again (S408). Control module 11 is configured to determine whether or not the detected illuminance is significantly greater than the predetermined amount based on a comparison between the currently detected illuminance and a previously detected illuminance stored in memory module 12 (S409). In the case where the illuminance is not significantly greater than the predetermined amount (S409: NO), control module 11 can determine whether or not a predetermined time has elapsed (S410). In the case where the predetermined time has elapsed (S410: YES), control module 11 can release restricted area RA (S411).

Unless the predetermined time has elapsed (S410: NO), control module 11 can repeat the processing from step S407 to step S409.

In the case where the user takes portable phone 1 out of a bag or the like and starts to use portable phone 1, the outer environment of portable phone 1 suddenly becomes bright, causing the illuminance to increase significantly. In the case where control module 11 determines that the illuminance is significantly greater than the predetermined amount before the predetermined time has elapsed (S409: YES), control module 11 can release restricted area RA without waiting for the predetermined time to elapse (S411).

After releasing restricted area RA (S411), control module 11 can end the restricted area defining process.

Thus, according to the present modification, restricted area RA is defined in the case where portable phone 1 is considered as not being used. Therefore, it is possible to further suppress the deterioration in the operability of portable phone 1.

Further, according to the present modification, after restricted area RA is defined, when it is considered that the use of portable phone 1 is started again, restricted area RA is released without waiting for the predetermined time to elapse. Therefore, it is possible to further suppress the deterioration in the operability of portable phone 1.

It is acceptable that the restricted area defining process of the present modification is further modified in such a manner that the processing from step S407 to step S409 is dispensed so that no illuminance detection will be performed after restricted area RA is defined.

<Third Modification>

Figure 11:
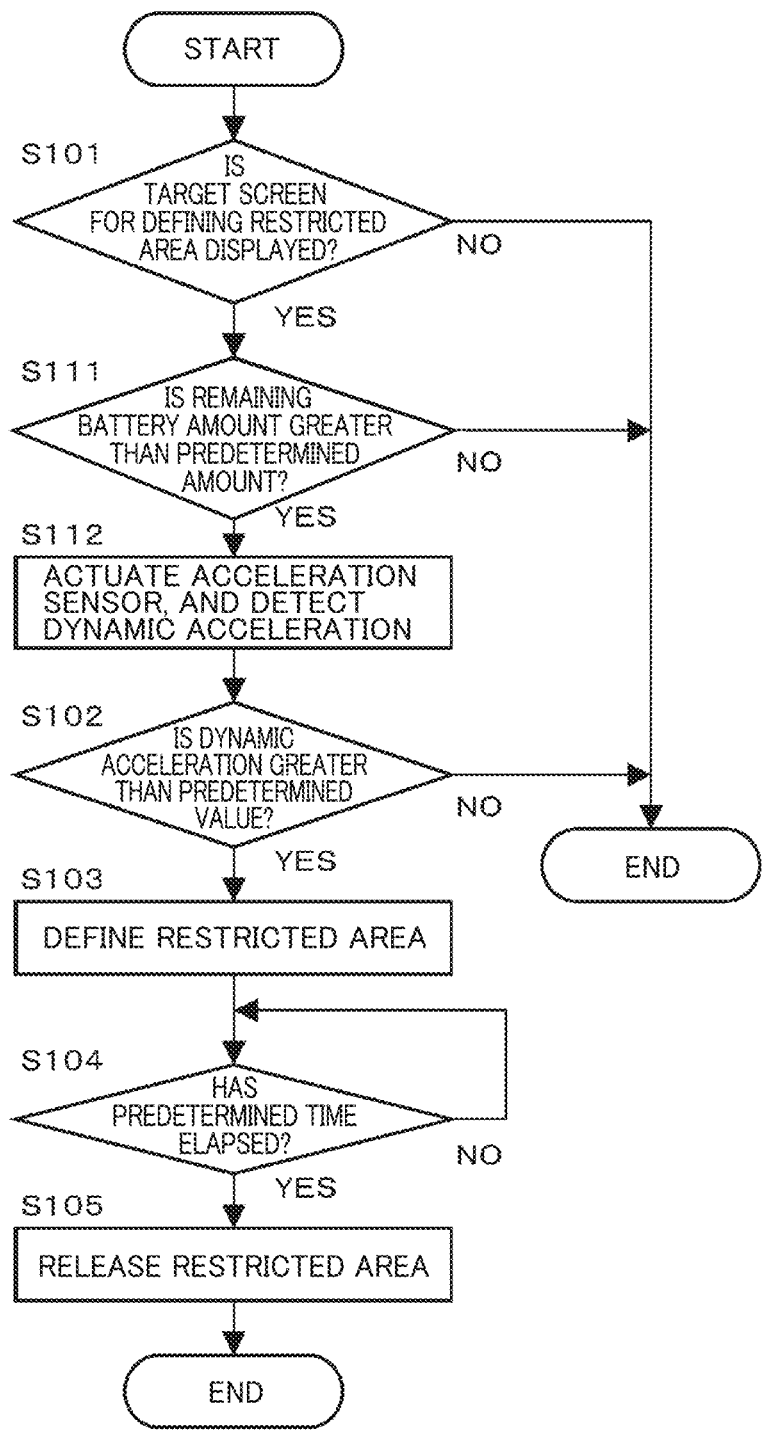
FIG. 11 is a flow chart illustrating a restricted area defining process.

FIG. 11 is a block diagram illustrating the overall configuration of portable phone 1 according to a third modification.

In the present modification, the processing from step S111 and step S112 is added to the restricted area defining process illustrated in FIG. 5A.

The present modification is different from any of the abovementioned embodiments in that acceleration detection module 20 is not configured to work constantly while portable phone 1 is in operation. In the present modification, the acceleration sensor of acceleration detection module 20 operates in accordance with the remaining battery amount of portable phone 1.

As illustrated in FIG. 11, control module 11, after determining that a screen being displayed on display 3 is a target screen for defining restricted area RA (S101: YES), determines whether or not the remaining battery amount is greater than a predetermined amount (20% for example) (S111).

In the case where the remaining battery amount is determined to be greater than the predetermined amount (S111: YES), control module 11 can control acceleration detection module 20 to activate the acceleration sensor so as to detect the dynamic acceleration (S112). After the detection of the dynamic acceleration, control module 11 can stop the acceleration sensor. On the other hand, in the case where the remaining battery amount is not more than the predetermined amount (S111: NO), control module 11 can end the restricted area defining process without activating the acceleration sensor.

According to the present modification, since the acceleration sensor will not be activated when the remaining battery amount is low, it is possible to suppress the power consumption when the battery is running low. Thereby, it is possible to reserve the electric power for performing primary functions such as making a call or the like.

The configuration of the present modification can also be applied to the first modification and the second modification.

<Other Modifications>

In any of the above embodiments, the width of restricted area RA is not particularly limited in both the vertical direction and the lateral direction. However, as mentioned in the above, the widths W1 and W2 of the respective left and right frames may be configured narrower than the widths W3 and W4 of the upper and lower frames. As such, when portable phone 1 is being held, it is easier for a finger to touch the central part of touch panel 4 from the left and right edges than from the upper and lower edges thereof. Thus, as illustrated in FIG. 12(a), restricted area RA may be configured to have the right and left widths W5 and W6 wider than the upper and lower widths W7 and W8. Furthermore, frame member 2a may be configured to have the width W4 of the lower frame narrower than the width W3 of the upper frame. Thus, as illustrated in FIG. 12(b), restricted area RA may be configured to have the left and right widths W5 and W6 wider than the upper and lower widths W7 and W8, and the lower width W8 wider than the upper width W7.

In the case where the width W3 of the upper frame is sufficiently wide for a user to hold portable phone 1 and thereby it is unlikely for a finger to touch the upper edge of touch panel 4, as illustrated in FIG. 12(c), restricted area RA may be configured to dispense the upper area. Similarly, in the case where the widths W3, W4 of the upper and lower frames are sufficiently wide for a user to hold portable phone 1, as illustrated in FIG. 12(d), restricted area RA may be configured to dispense the upper and lower areas. In other words, restricted area RA is not necessarily to be provided surrounding the entire periphery of the inner peripheral edge of touch panel 4, and may be provided along at least a part of the inner peripheral edge of touch panel 4.

Thus, restricted area RA can be provided in accordance with the width of each frame of frame member 2a, which makes it possible to further suppress the deterioration in the operability of portable phone 1.

In addition, portable phone 1 may be configured to have restricted area RA visibly displayed on display 3, making the user aware of the presence of such area that the touch operation will be restricted therein.

In any of the above embodiments, it is configured that all of the touch operations are invalidated in restricted area RA, but it is acceptable to invalidate some types of touch operations such as some tap operations or some longer tap operations which may readily result in erroneous operations due to accidental finger touches on touch panel 4.

In any of the above embodiments, the present disclosure is applied to a portable phone represented by a smartphone but not limited thereto, the present disclosure may be applied to any other types of portable phones such as a bar phone, a flip phone, a slider phone and the like.

Furthermore, the present disclosure may be applied to various portable devices such as a PDA (Personal Digital Assistant), a tablet PC, an e-book terminal, a portable music player, a portable television and a portable navigation system without being limited to a portable phone.

Although embodiments of the present disclosure has been described and illustrated in detail, it is clearly understood that the same is by way of illustration and example only and is not to be taken by way of limitation. Any embodiment may be modified within the scope of the present disclosure interpreted by the terms of the appended claims.

The invention claimed is:

1. A portable device comprising:
a display;
a touch panel configured to detect a touch operation on the display; and
at least one processor that
identifies an application that is being executed in a foreground,
determines whether or not the identified application is included in a target screen list, wherein the target screen list comprises a list of applications stored on the portable device for which a restricted area is to be activated,
when the identified application is included in the target screen list, activates the restricted area in which acceptance of the touch operation is restricted based at least in part on the application being included in the target screen list, and
when the identified application is not included in the target screen list, does not activate the restricted area.

2. The portable device according to claim 1, wherein the restricted area comprises at least a part of an inner peripheral edge of the touch panel.

3. A method for activating a restricted area, in which acceptance of a touch operation is restricted, within a touch panel configured to detect the touch operation to a display, the method comprising:
identifying an application that is being executed in a foreground;
determining whether or not the identified application is included in a target screen list wherein the target screen list comprises a list of applications stored on a portable device for which the restricted area is to be activated,
when the identified application is included in the target screen list, activating the restricted area based, at least in part, on the determination that the identified application is included in the target screen list; and,
when the identified application is not included in the target screen list, not activating the restricted area.

4. The portable device according to claim 1, wherein the target screen list consists of a list of applications for which a touch operation is unlikely to be performed by a user.

* * * * *